United States Patent

[11] 3,621,929

[72] Inventors: Heinrich Oberthur, Offenbach-Rumpenheim; Otto Depenheuer, Bad Homburg, both of Germany
[21] Appl. No.: 860,605
[22] Filed: Sept. 24, 1969
[45] Patented: Nov. 23, 1971
[73] Assignee: International Telephone and Telegraph Corporation, New York, N.Y.
[32] Priority: Sept. 28, 1968
[33] Germany
[31] P 17 88 077.2

[54] BRAKE SYSTEM FOR ELECTRICALLY OPERATED VEHICLES
5 Claims, 6 Drawing Figs.

[52] U.S. Cl. .............................................. 180/65 R, 188/156, 192/2, 303/3, 318/139, 318/371
[51] Int. Cl. .............................................. B60l 7/24
[50] Field of Search .............................................. 180/65; 318/371, 139; 188/159, 156; 303/3, 15; 192/2

[56] References Cited

UNITED STATES PATENTS

| | | | |
|---|---|---|---|
| 2,118,412 | 5/1938 | McCune | 188/159 UX |
| 2,348,053 | 5/1944 | Bowker | 180/65 X |
| 3,114,871 | 12/1963 | Schenkleberger | 180/65 X |
| 3,171,505 | 3/1965 | Imelmann | 180/65 |

FOREIGN PATENTS

| 391,890 | 5/1933 | Great Britain | 303/3 |
|---|---|---|---|

Primary Examiner—Benjamin Hersh
Assistant Examiner—Milton L. Smith
Attorneys—C. Cornell Remsen, Jr., Walter J. Baum and Paul W. Hemminger ABSTRACT: A braking and driving system for electrically operated vehicles including an electric motor for driving the vehicle which may be operated as a generator to provide additional braking and recovery of braking energy by charging the battery. Hydraulic braking on the drive axle is delayed until the maximum level of electromotive braking is reached. This allows the design distribution of braking between the front and rear axles to be maintained while insuring a maximum recovery of braking energy through charging of the battery.

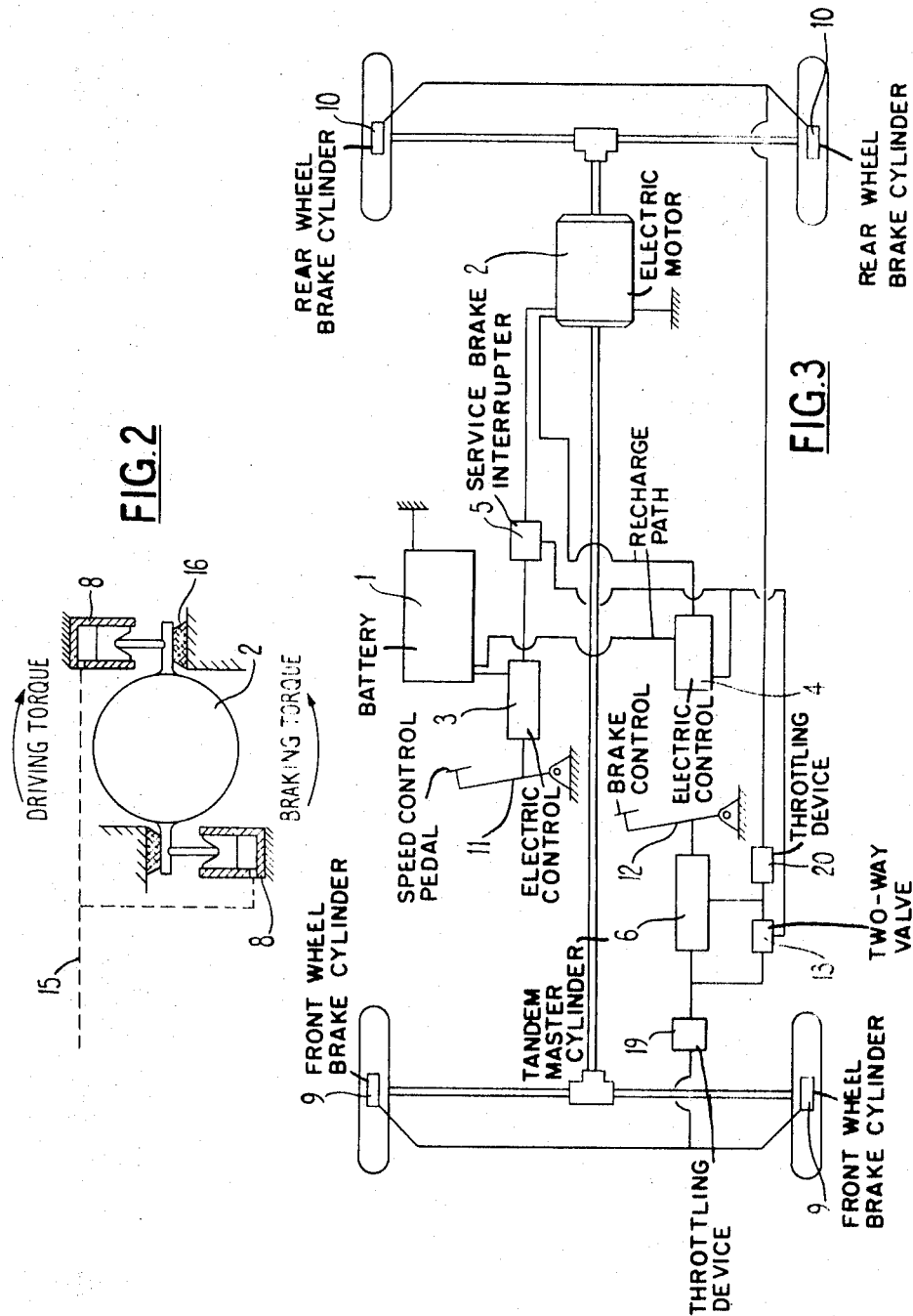

3,621,929

BRAKE SYSTEM FOR ELECTRICALLY OPERATED VEHICLES

BACKGROUND OF THE INVENTION

The invention relates to braking systems for electrically operated vehicles and particularly to systems which utilize an electric motor acting as a generator to provide additional braking and to recover braking energy by charging the battery.

Conventional small electrically operated vehicles in general possess three separate braking systems: a hydraulic service brake, a mechanical parking brake, and, in addition, an electromotive brake if the motor functions as a generator, in which case part of the energy is simultaneously recovered and fed into the battery. In these systems the electromotive brake effects only a fraction of the total required braking.

Also known is an eddy current brake in which the resistance to rotation is produced by eddy currents generated by the rotation of metal disks in a magnetic field of force. In contrast with the electromotive brake no recovery of energy is possible with eddy current brakes.

SUMMARY OF THE INVENTION

It is an object of this invention to provide a braking system for an electrically operated vehicle in which the electric motor for driving the vehicle may act as a generator to provide supplemental braking without affecting the designed distribution of brake force between the front and rear vehicle axles and in which the braking energy produced by the electric motor acting as a generator is recovered by charging the battery.

It is a further object of this invention to provide an electrically operated vehicle in which an electric motor acting as a generator provides braking for at least one axle prior to the application of the hydraulic brakes to the wheels of that axle.

It is a further object of this invention to provide a system of this type in which the hydraulic brakes do not become effective until the maximum braking force obtainable through the electric motor acting as a generator has been attained, thereby maximizing the braking energy which may be recovered by charging the battery.

These objects are achieved in an electrically operated vehicle having an electric motor drive by providing an electric motor which may act as a generator and which is connected to the battery through an electric control which is responsive to the position of a speed control pedal for motor operation and which is connected to the hydraulic brake system of the vehicle by means of a second electric control device which is responsive to the hydraulic brake pressure so as to interrupt the operation as an electric motor and control its operation as a generator to provide braking and charging of the battery.

To insure that the maximum braking energy which may be recovered through the charging of the battery is actually recovered, the application of the hydraulic brakes may be delayed with respect to the braking effect of the electric motor acting as a generator. If the vehicle has rear-wheel drive, the electric motor has a hydraulic torque-absorbing support acting to prevent rotation of the electric motor when braking takes place. The pressure developed in the hydraulic support acts on a balancing valve in the hydraulic brake system to prevent the application of the rear wheel brakes until the torque in the electric motor operating as a generator has reached its maximum value.

BRIEF DESCRIPTION OF THE DRAWINGS

FIG. 2 is a diagrammatic representation of the hydraulic supports for the electric motor.

FIG. 3 is a diagrammatic representation of a braking system for an electrically operated vehicle with all-wheel drive.

DESCRIPTION OF THE PREFERRED EMBODIMENTS

It is well known that an electric motor can be designed so that it may be driven as a generator when separated from its power supply to produce electric energy and provide a braking effect.

Figure 4:
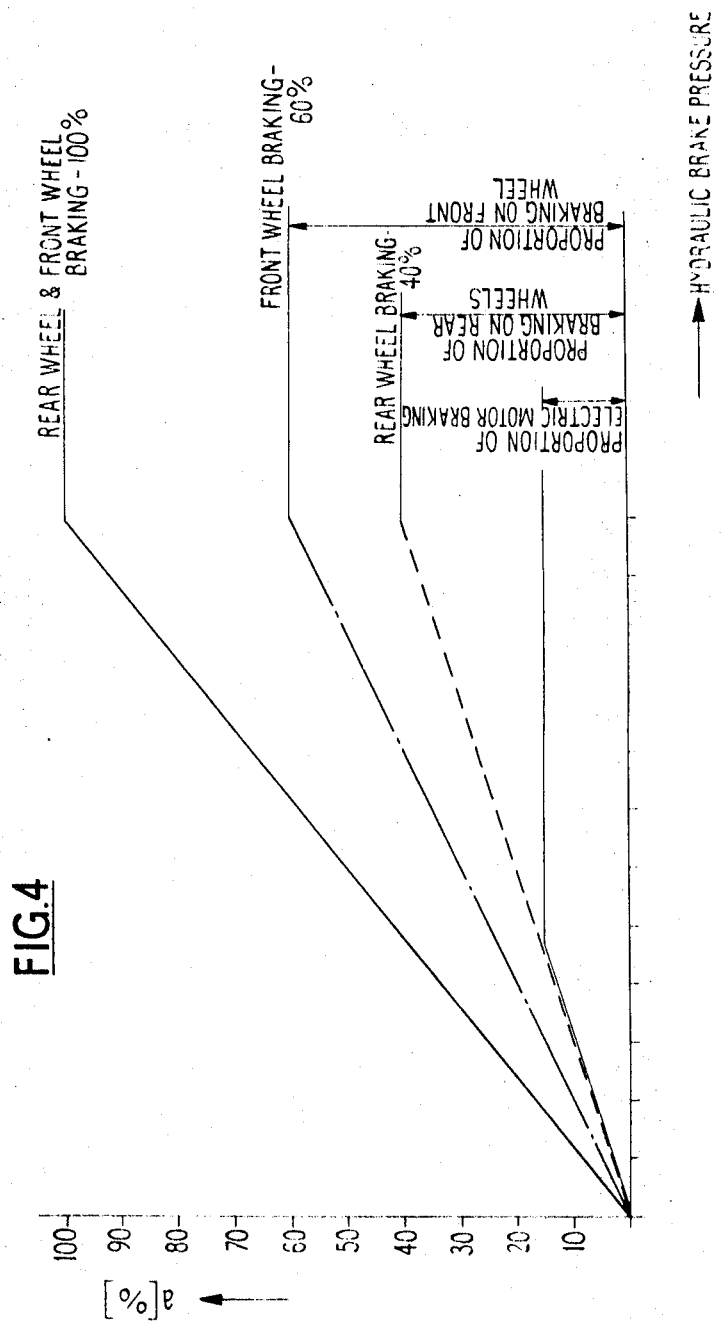
FIG. 4 depicts the distribution of braking force to the front and back axle. The possible characteristic curve of electromotive braking is drawn in on the back axle but not considered as part of the total braking.

FIG. 4 shows the relationship between the braking effects on the front and rear axles of a vehicle and the possible braking on the rear axle wheels by means of an electric motor operating as a generator. Although the braking effect of the electric motor operating as a generator is not shown as part of the total braking on the front and rear axles, it will be apparent that the curve of total braking would show an abrupt change in slope if the electric motor braking effect, which increases with brake pressure until it levels off at some maximum value, were merely added to the normal hydraulic braking on the rear axle wheels.

Figure 5:
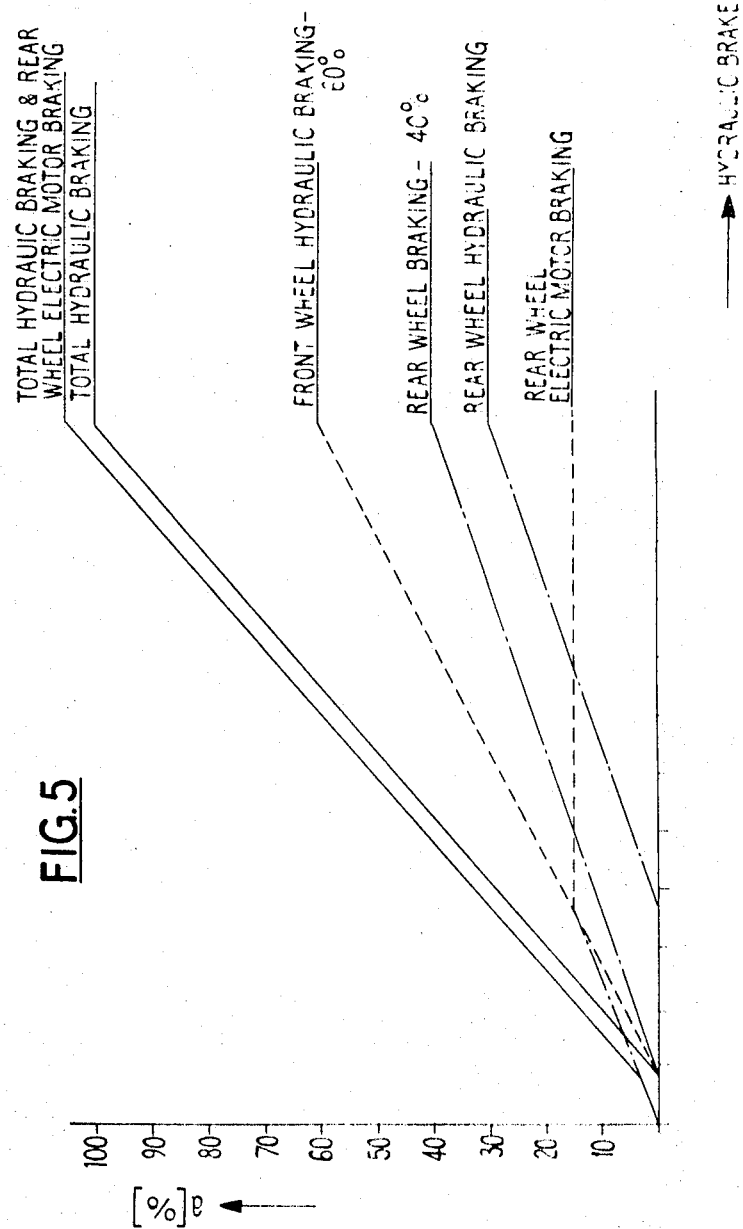
FIG. 5 is a diagrammatic representation of the desired brake force distribution with regard to the electromotive braking on the back axle of an electrically operated vehicle with rear-wheel drive.

According to this invention, as shown in FIG. 5, the operation of the hydraulic brakes on the rear wheel is delayed until the maximum braking effect of the electric motor acting as a generator is obtained so as to maintain the designed distribution of brake force between the front and rear axles and to insure maximum recovery of braking energy.

Thus, in the case of an electrically operated vehicle with rear-wheel drive, hydraulic brake pressure is applied to the brake cylinders of the front axle immediately upon commencement of braking while rear axle wheels are braked by means of the electric motor acting as a generator. Only after the braking effect of the electric motor has reached its maximum value do the hydraulic brakes on the rear wheels become activated. Hydraulic braking on the rear wheels then adds to the electric motor braking, which remains constant as brake pressure increases. In order to obtain the intended brake force distribution between the axle, the hydraulic braking on the rear wheels must increase with increased brake pressure at the same rate as the electric motor braking increased to its maximum value.

Figure 1:
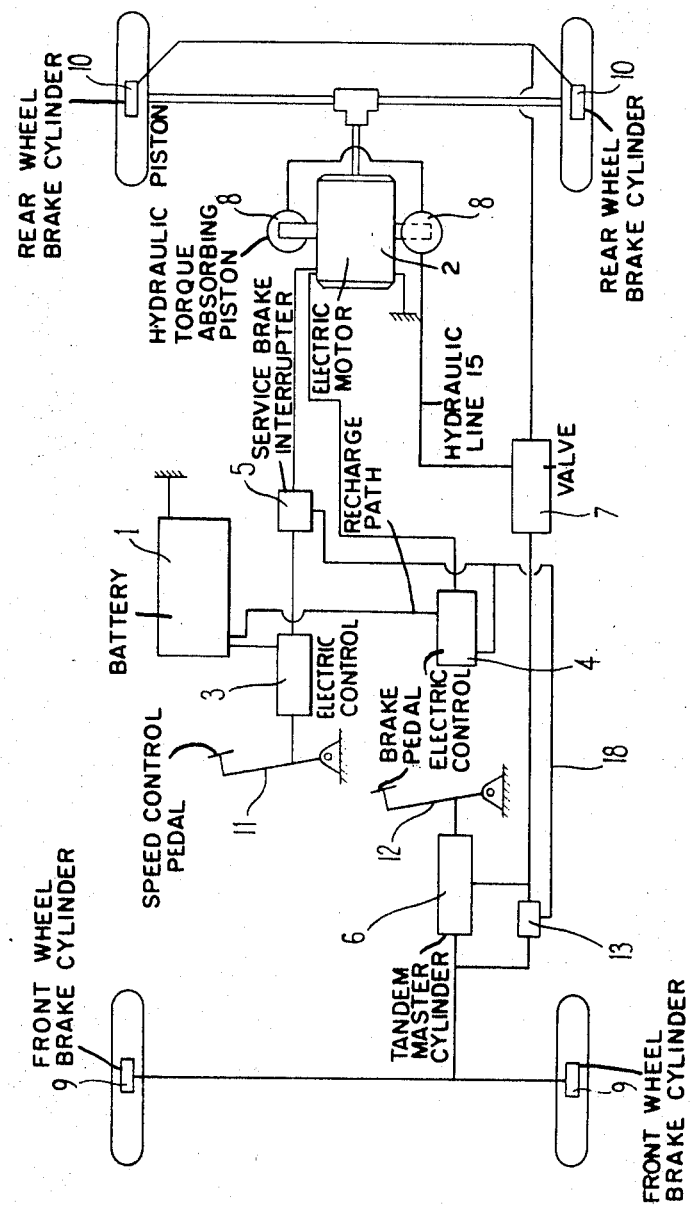
FIG. 1 is a diagrammatic representation of a braking system for an electrically operated vehicle with rear wheel drive.

FIG. 1 show the invention embodied in a braking system for an electrically operated vehicle having a rear-wheel drive.

The electric motor and hydraulic brakes are integrated into a common system. The electric motor 2 which drives the rear axles is connected to a battery 1 via a service brake interrupter 5 and an electric control 3, which is responsive to the mechanical operation of a speed control pedal 11. The position of the speed control pedal determines the driving speed of the series wound electric motor.

The hydraulic braking system comprises a tandem master cylinder 6 which is actuated by a brake pedal 12. The tandem master cylinder is connected to the wheel brake cylinders 9 of the front axle wheels directly and with the wheel brake cylinders 10 of the rear axle through a valve 7 which is opened to allow braking on the rear wheels only when the pressure in hydraulic line 15 exceeds a predetermined value. The hydraulic line 15 is connected to hydraulic piston torque-absorbing supports 8 of the electric motor so that the pressure in the hydraulic line 15 is a function of the torque generated by the electric motor acting as a generator. This is shown in FIG. 2. When the electric motor is operated as a motor, it is supported by the firm bearings 16. However when the electric motor functions as a generator, the torque generated by the electric motor is reversed and the electric motor is supported by the hydraulic supports 8 which produce a hydraulic pressure which is a function of the braking torque produced.

The service brake interrupter 5 and a second electric control 4 are connected to the hydraulic brake system via line 18 and a two-way valve 13 which receives a pressure signal from both the hydraulic line leading to the front wheels and from the hydraulic line leading to the rear wheels.

The system shown in FIG. 1 operates as follows. When the speed control pedal is depressed by the operator, the electric motor 2 is connected to the battery via the electric control 3 which is mechanically connected to the speed control pedal. When the brake pedal 12 is actuated, hydraulic brake pressure developed in the tandem master cylinder 6 is transmitted to the front wheel brakes. However, the pressure in the rear wheel brake circuit is transmitted only as far as the valve 7, which is initially closed. The hydraulic brake pressure is also transmitted to the electric control device 4 and the service brake interrupter 5. The service brake interrupter disconnects the electric motor from the battery as a source of power while the electric control 4 regulates the function of the electric motor as a generator. The two-way valve 13 is connected so that it may be actuated by the hydraulic pressure in either the front wheel or rear wheel circuits and will isolate either circuit if it becomes inoperative while still actuating the service brake interrupter 5 and the electric control 4.

The electric control 4 includes a transducer which controls the electric motor operating as a generator as a function of the brake pressure exerted by the brake pedal 12. The electric motor is driven by the kinetic energy of the vehicle and acts as a brake via an inductive link which has a characteristic curve which gives the desired distribution between front and rear axle braking. The electric control 4 is connected to the battery to enable the electricity produced by the electric motor acting as a generator to be recovered by charging the battery 1.

Due to the hydraulic supports 8 for the electric motor described above, the torque produced by the electric motor when operating as a generator will increase the pressure in line 15 until the maximum electromotive braking is reached. At this point the balancing valve 7 is set to open to allow the pressure generated in the master cylinder to be transmitted to the rear axle brakes. Thus, hydraulic braking is provided on the rear wheels in addition to the braking of the electric motor acting as a generator.

FIG. 3 shows the invention embodied in a vehicle with all-wheel drive. Except as described below, this system is identical to that shown in FIG. 1.

Figure 6:
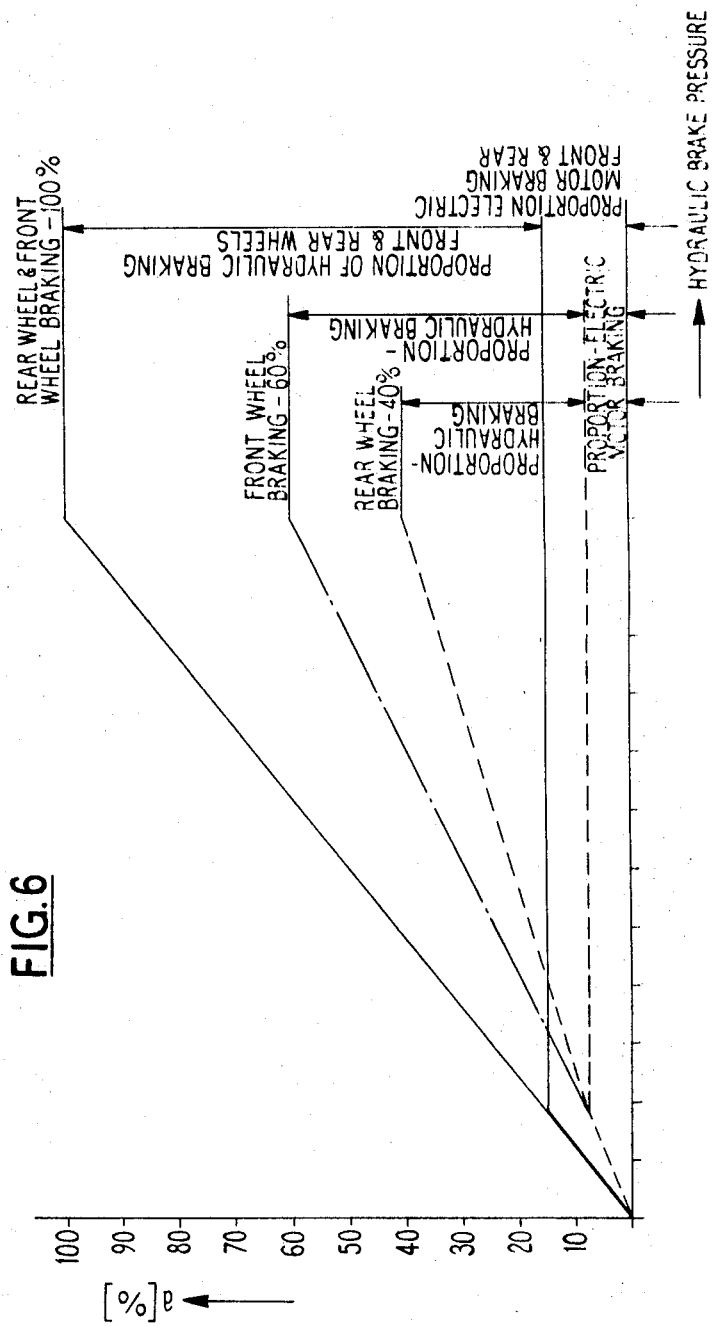
FIG. 6 is a diagrammatic representation of the desired brake force distribution of an electrically operated vehicle with all-wheel drive.

The braking forces produced by the electric motor acting as a generator are evenly distributed to the front and rear axle brakes. The braking effect of the hydraulic brakes is retarded so that the hydraulic brakes are not applied until the braking effect of the electric motor acting as a generator has reached it maximum value. This may be accomplished by providing an electric control 4 which responds immediately to hydraulic brake pressure and a throttling of the hydraulic brakes to delay their reaction to brake pressure. The throttling devices are shown schematically by the elements 19 and 20 in the front and rear brake circuits respectively. The operation of the system of FIG. 3 is shown graphically in FIG. 6.

Although the above embodiments show a single electric motor for the vehicle, it will be obvious that several electric motors may be provided for individual wheels or separate axles with a similar braking system operating as described above.

It will be appreciated that the invention illustrated and described herein may be modified by those skilled in the art without deviating from the spirit and scope of the invention as set forth in the following claims.

We claim as our invention:

1. A driving and braking system for electrically operated wheeled vehicles comprising:
 a hydraulic braking system for the vehicle including a master cylinder, hydraulic brake circuits coupled to said master cylinder and a brake pedal actuated by the operator to produce hydraulic brake pressure in said master cylinder;
 a battery;
 an electric motor connected between the battery and vehicle-driving axle; and
 electric control means responsive to the position of a speed control pedal for controlling the flow of current from the battery to the electric motor to drive the vehicle and responsive to said hydraulic brake pressure in said master cylinder upon operation of said brake pedal for interrupting the current to the electric motor and for controlling the flow of current from the electric motor operating as a generator to the battery to provide additional braking while simultaneously charging the battery.

2. A driving and braking system for electrically operated wheeled vehicles comprising:
 a hydraulic braking system for the vehicle;
 a battery;
 an electric motor connected between the battery and vehicle-driving axle;
 electric control means responsive to the position of a speed control pedal for controlling the flow of current from the battery to the electric motor to drive the vehicle and responsive to the brake pressure in the hydraulic brake system for interrupting the current to the electric motor and for controlling the flow of current from the electric motor operating as a generator to the battery to provide additional braking while simultaneously charging the battery; and
 means responsive to the mechanical torque produced by the electric motor operating as a generator for preventing the brake pressure in the hydraulic brake system from being applied to the brakes until said torque exceeds a predetermined value.

3. The driving and braking system of claim 2, wherein the vehicle has rear-wheel drive and the means responsive to said torque produced by the electric motor acting as a generator prevents said brake pressure from being applied to the rear wheels while permitting the immediate application of the front wheel brakes.

4. A driving and braking system for electrically operated wheeled vehicles comprising:
 a hydraulic braking system for the vehicle;
 a battery;
 an electric motor connected between the battery and vehicle-driving axle;
 electric control means responsive to the position of a speed control pedal for controlling the flow of current from the battery to the electric motor to drive the vehicle and responsive to the brake pressure in the hydraulic brake system for interrupting the current to the electric motor and for controlling the flow of current from the electric motor operating as a generator to the battery to provide additional braking while simultaneously charging the battery; and
 means responsive to the torque produced by the electric motor operating as a generator for preventing the brake pressure in the hydraulic brake system from being applied to the brakes until the torque exceeds a predetermined value; said means responsive to the torque including electric motor supports which generate a pressure signal which is a function of the torque when the electric motor operates as a generator and a valve in the hydraulic brake system responsive to the pressure signal for preventing the brake pressure in the hydraulic brake system from being applied to the brakes until the pressure signal exceeds a predetermined value.

5. A driving and braking system for electrically operated wheeled vehicles comprising:
 a hydraulic braking system for the vehicle;
 a battery;
 an electric motor connected between the battery and vehicle-driving axle;
 electric control means responsive to the position of a speed control pedal for controlling the flow of current from the battery to the electric motor to drive the vehicle and responsive to the brake pressure in the hydraulic brake system for interrupting the current to the electric motor and for controlling the flow of current from the electric motor operating as a generator to the battery to provide additional braking while simultaneously charging the battery;

means responsive to the torque produced by the electric motor operating as a generator for preventing the brake pressure in the hydraulic brake system from being applied to the brakes until the torque exceeds a predetermined value;

wherein the vehicle has rear-wheel drive and the means responsive to torque produced by the electric motor acting as a generator prevents the brake pressure from being applied to the rear wheels while permitting the immediate application of the front wheel brakes;

said means responsive to the torque including electric motor supports which generate a pressure signal which is a function of the torque produced when the electric motor operates as a generator and a valve in the hydraulic brake line to the rear wheels responsive to the pressure signal for preventing the brake pressure in the hydraulic brake system from being applied to the rear wheel brake until the pressure signal exceeds a predetermined value.

* * * * *